United States Patent [19]

Bosma

[11] 3,712,712

[45] Jan. 23, 1973

[54] ADJUSTABLE COLUMN MAGNIFIER

[75] Inventor: George O. Bosma, Denver, Colo.

[73] Assignee: Lri Corporation, Denver, Colo.

[22] Filed: Feb. 24, 1969

[21] Appl. No.: 801,706

[52] U.S. Cl. ....................350/247, 116/119, 350/116

[51] Int. Cl. ............................................G02b 27/02

[58] Field of Search.........250/71; 350/211, 240–243, 350/245–252; 116/119; 281/42; 40/352–356

[56] References Cited

UNITED STATES PATENTS

| | | | |
|---|---|---|---|
| 547,114 | 10/1895 | Graham | 350/241 |
| 2,883,770 | 4/1959 | Lieb | 250/71 |
| 2,957,390 | 10/1960 | Baukus | 350/241 |
| 3,140,883 | 7/1964 | Anthony | 350/211 |
| 3,137,269 | 6/1964 | Sager | 116/119 |

*Primary Examiner*—David Schonberg
*Assistant Examiner*—Michael J. Tokar
*Attorney*—Anderson, Spangler & Wymore

[57] ABSTRACT

This invention relates to an adjustable column magnifying device in the form of an elongated narrow strip of transparent material forming a slide carrier having a transversely-extending magnifier mounted thereon for vertical slidable movement between integral stops located adjacent the upper and lower extremities of the carrier. A spring clip on the back of the carrier near the top is adapted to hook behind one or more pages of a columnar printed work and hold the unit in place.

10 Claims, 5 Drawing Figures

INVENTOR
GEORGE O. BOSMA
BY
ATTORNEYS

ADJUSTABLE COLUMN MAGNIFIER

Many columnar printed works, particularly the telephone directories, have print so small that it becomes quite difficult to read for many people. While the print could, undoubtedly, be enlarged considerably, to do so would be prohibitively expensive and involve multi-volume directories in the large urban areas. The net result of the small, difficult to read, print is that many persons avail themselves of the information services provided by the telephone companies and don't even bother to look up the number in the directory. Thus, one of the most highly automated industries in the world is forced to employ substantial numbers of information operators to handle such calls at a tremendous per call expense when compared with the cost of making the same call utilizing the automatic facilities.

Another problem having nothing whatsoever to do with poor eyesight that effects virtually everyone is that of having to go through the procedure of looking up a number all over again after finding it busy or, for some reason, the called party unavailable. All too often, the caller fails to write down the number after looking it up only to miss completing the call and be left with the prospect of returning to the phone book, finding the proper page, column and alphabetical listing.

Magnifiers of one type or another are, of course, quite common and they are quite adequate for use in enlarging the print; however, this is only part of the overall problem. A hand-held magnifying lens is quite difficult to use for quickly scanning a column to locate a particular alphabetical listing whether it be in a telephone directory, dictionary or other similar columnar work. Also, once the specific entry has been found, the ordinary magnifier is substantially worthless for holding the place if the entry needs to be relocated even if the book is left open. Closing the book will almost certainly displace those in common use.

It has now been found in accordance with the teaching of the instant invention that these and other problems can, in large measure, be eliminated through the use of the adjustable column magnifier of the present invention. It employs a transparent slide carrier having a simple spring clip which, when hooked behind one or more pages, locates the unit vertically while permitting lateral adjustment thereof across the page to line up with a selected column. Once this has been accomplished, the slide can be moved up or down until it registers with the particular entry which appears in magnified form when viewed therethrough. The slide is held frictionally against the side margins of the slide carrier sufficiently tight to hold its aligned position over the particular entry even with the book closed should the need arise to refer to it again. The overall thickness of the unit is such that closing the book thereon will not damage either the magnifier slide or the pages adjacent thereto. Rounded edges on the slide also protect the pages against being scraped and torn as it is moved up and down the column. Simple integral stops keep the slide from becoming detached from its carrier and lost.

It is, therefore, the principal object of the present invention to provide a novel and improved column magnifier.

A second objective is the provision of a unit of the type aforementioned that is especially well suited for use in locating entries in a telephone directory.

Another object of the invention herein disclosed and claimed is the provision of a column entry locating device which maintains its adjusted position and marks the selected entry even with the book closed.

Still another objective is to provide a print magnifying device that has a transparent carrier fitted with a spring clip by means of which the unit can be releasably fastened to a few pages of the book or other columnar printed work.

An additional object is to provide a column entry magnifier that has adequate space left over on the carrier both above and below the printed column covered thereby to be imprinted with several emergency telephone numbers such as, for example, police and fire departments, poison control center, doctor, ambulance and the like.

Further objects of the invention are to provide a unit for marking and magnifying column entries that is quite inexpensive, easy to operate, rugged, versatile, readily adaptable to most columnar printed works, simple to manufacture and even decorative in appearance.

Other objects will be in part apparent and in part pointed out specifically hereinafter in connection with the description of the drawings that follows, and in which.

Figures 2, 3, 4, 5:
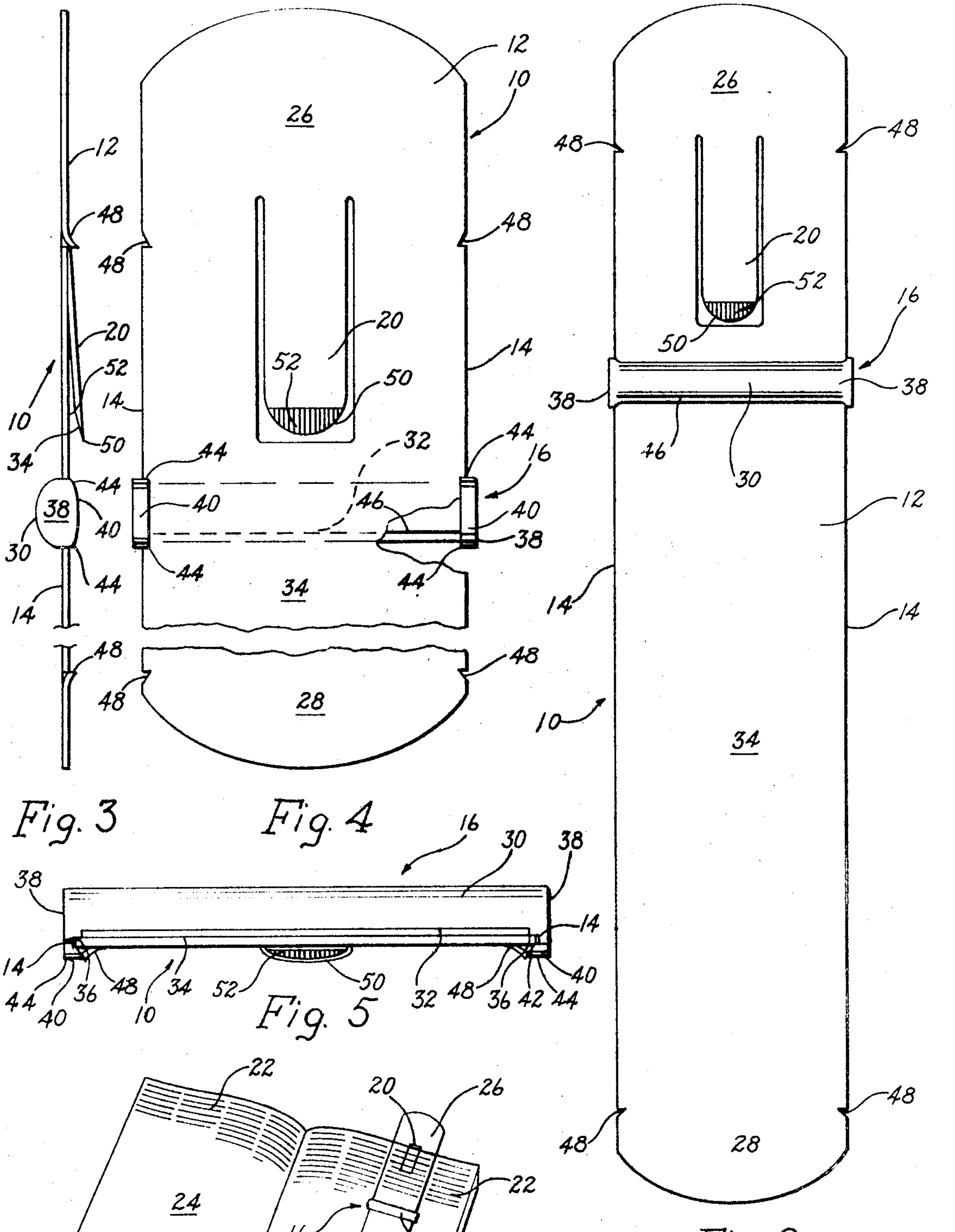
FIG. 2 is a top plan view of the column magnifier showing it approximately two-thirds the size it would be if made for use with the ordinary metropolitan area telephone directory.
FIG. 3 is a right side elevation of the unit showing the latter approximately full size with a portion of the slide carrier broken away to conserve space.
FIG. 4 is a bottom plan view to the same scale as FIG. 3, again having a portion intermediate the ends of the carrier broken away to conserve space; and, FIG. 5 is a bottom end view to a further enlarged scale.

Referring now to the drawings for a detailed description of the present invention, it will be seen that the column magnifier which has been broadly designated by reference numeral 10 includes an elongate strip of transparent sheet material forming a slide carrier 12 having transversely-spaced parallel side margins 14 along which rides a magnifying slide that has been referred to in a general way by reference numeral 16. Carrier 12 is preferably fabricated from a sheet of clear transparent plastic material of sufficient thickness, say about 1/16 inch, to resist undue bending and provide adequate support for the slide 16. Making the carrier out of thicker stock, while acceptable, offers no particular advantage, is more expensive and might even damage the book if closed thereon.

Figure 1:
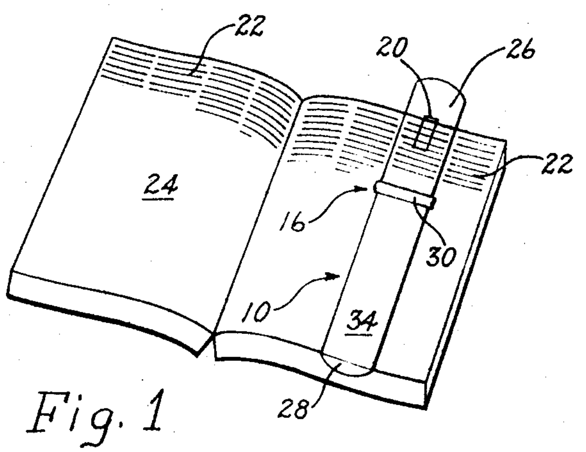
FIG. 1 is a small scale perspective view looking upwardly and slightly to the left upon a columnar printed work like a telephone directory showing the column magnifier of the present invention in place thereon marking a particular entry.

The width of the carrier is at least equal, and preferably somewhat greater than the width of the particular column it is to cover. Likewise, the overall length of the carrier should at least be sufficient to permit the slide to move the full length of the column when the spring clip 20 of the carrier, which will be described in detail presently, has been hooked over the top edge of several pages 22 in a columnar printed work 24 as shown in FIG. 1. In the preferred embodiment of the invention illustrated herein, at least one end of the carrier, and perhaps both ends, should project sufficiently beyond the corresponding page edges to leave space for the imprintation of emergency numbers that remain visible to the user even when the book is closed. For example, the overhanging area 26 at the top of the carrier might well be imprinted or embossed with local emergency numbers while the corresponding overhanging area 28 at the bottom could carry the name, telephone number, address and, possibly, even a brief advertising message from the supplier of the column magnifier.

Before proceeding further with the description of the remaining distinctive features of the carrier 12, it might be well to turn briefly to the slide 16 and set forth how it is mounted on the carrier, for which purpose reference will be made to FIGS. 2–5, inclusive, and particularly FIG. 5. Slide 16 includes an elongated generally semi-cylindrical, convex magnifying lens 30 having an essentially planar undersurface 32 preferably held in spaced relation above the adjacent surface 34 of the carrier by a pair of integrally-formed runners 36. These runners are located at opposite ends of the slide in position to run along the side edges of the carrier beyond the limits of the column. Thus, if the runners scar the side edges of the carrier as the slide is repeatedly run up and down, no portion of the columnar entry will be obliterated. It is for this same reason, of course, that the undersurface 32 of the lens 30 is held in spaced relation to the central viewing area 34 of the carrier.

The overall length of the slide is somewhat greater than the width of the carrier so as to provide overhanging end portions 38 that have feet 40 projecting beneath the carrier and internal opposed horizontal grooves 42 adapted to receive the edges of the latter. The width and depth of grooves 42 are selected to cooperate with the width of the carrier so as to prevent the slide from becoming skewed and also to keep it in a chosen adjusted position until moved. In the preferred construction and mode of operation of the unit, the user should be able to set the slide at a particular column entry, close the book and reopen it to find no significant change in position had occurred.

The feet 40 of the slide will, obviously, move in slidable contact with the page and, for this reason, the corners 44 thereof (FIG. 3) are preferably rounded off slightly as shown. In the particular form illustrated, the slide is moulded or otherwise fabricated as a one-piece unit and, as such, it would, more than likely, be made of clear plastic rather than glass. For purposes such as this, the quality of a plastic lens 30 is quite adequate as minor distortion is easily tolerated. On the other hand, if one chose to make the lens of glass, the remaining elements of the slide would likely not be formed integral therewith, but rather, be made from metal much in the manner of the indicator on a slide rule.

As shown in FIGS. 2 and 4 and particularly the latter, the undersurface 32 of the lens 30 is preferably provided with indicia 46 in the form of a transversely-extending straight black line that can be placed beneath the selected columnar entry. Of course, the lower edge of the slide can be used for this same purpose; however, if, as preferred, the lens 30 is wide enough to cover and magnify more than one entry, say three, the line can be located beneath the particular one chosen.

Still with reference to FIGS. 2–5, inclusive, but returning, once again, to the carrier 12, it will be seen that stops 48 are provided adjacent both the upper and lower ends to keep the slide 16 from being removed therefrom. While these stops 48 may take many forms, probably the simplest and, certainly, one of the least expensive is that shown, namely, small downturned ears freed from the side margins of the carrier by a short inwardly-directed cut. Only one such stop-forming ear is required on each end of the carrier to prevent the slide from being removed; however, a pair at each end on a transverse line extending normal to the direction of slide movement are preferred as shown.

The sole remaining feature requiring description is spring clip 20 for which reference will, once again, be made to FIGS. 2–5. This clip 20 is formed integral with the carrier 12 adjacent the upper end thereof by cutting same free along both sides and the bottom while leaving the upper end connected. As shown in FIGS. 3 and 5, the clip preferably has the lower rounded edge 50 thereof displaced slightly behind the plane of the carrier to make it easier to clip over the top edge of one or more pages of a columnar work as shown in FIG. 1. The rounded edge 50 is also shown chamfered or feathered as at numeral 52 to facilitate its being inserted into the pages of the book. Obviously, it is not necessary that the clip be displaced out of the plane of the carrier permanently as shown because this can easily be accomplished manually at the time of use by springing same down with light thumb pressure. Here again, the clip may be formed integral with the carrier as shown in which case it would be made of the same material or, if preferred, it may constitute a separate element and thereby be made of spring metal or other desired material.

What is claimed is:

1. The adjustable column magnifier which comprises: a strip of clear transparent relatively rigid sheet material formed to provide a vertically-elongated essentially planar slide carrier having transversely-spaced parallel side margins; and, a slide including a transversely-extending generally semi-cylindrical lens sized and shaped to uniformly magnify at least one complete column entry, and transversely-spaced means depending from the underside of the lens containing opposed inwardly-facing grooves adapted to slidably receive the parallel side margins of the carrier and mount said lens thereon for relative vertical adjustment.

2. The adjustable column magnifier as set forth in claim 1 in which: stop-forming means are provided adjacent the upper and lower extremities of the slide carrier positioned and adapted to engage the slide and prevent removal thereof.

3. The adjustable column magnifier as set forth in claim 1 in which: clip-forming means is located on the rear face of the slide carrier adjacent the upper end thereof, said means being adapted to hook behind one or more pages of a columnar work and hold the carrier in fixed position relative thereto.

4. The adjustable column magnifier as set forth in claim 1 in which: the grooves in the slide are spaced beneath the undersurface of the lens so as to maintain the latter in spaced relation above the near face of the carrier.

5. The adjustable column magnifier as set forth in claim 1 in which: the parallel side margins of the carrier are spaced apart at least a distance equal to the width of the column overlaid thereby, and the grooved means of the slide are disposed at opposite ends of the lens.

6. The adjustable column magnifier as set forth in claim 1 in which: the undersurfaces of the grooved means on the slide in contact with the page are curved to form convex runners.

7. The adjustable column magnifier as set forth in claim 1 in which: opaque indicia in the form of a line is provided on the lens adjacent the lower edge thereof.

8. The adjustable column magnifier as set forth in claim 2 in which: the stop-forming means comprise upper and lower transversely-spaced pairs of downturned ears located on the side margins of the carrier in the path of the grooved means.

9. The adjustable column magnifier as set forth in claim 3 in which: the clip-forming means comprise an integral tongue formed by cutting same free from the carrier along both sides and the bottom while leaving the top attached thereto.

10. The adjustable column magnifier as set forth in claim 9 in which: the bottom of the tongue is chamfered to a feathered edge.

* * * * *